(12) United States Patent
Yoon et al.

(10) Patent No.: US 7,426,287 B2
(45) Date of Patent: Sep. 16, 2008

(54) FACE DETECTING SYSTEM AND METHOD USING SYMMETRIC AXIS

(75) Inventors: Ho Sub Yoon, Taejon (KR); Do Hyung Kim, Taejon (KR); Jung Soh, Taejon (KR); Jae Yeon Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 731 days.

(21) Appl. No.: 10/872,471

(22) Filed: Jun. 22, 2004

(65) Prior Publication Data

US 2005/0135679 A1 Jun. 23, 2005

(30) Foreign Application Priority Data

Dec. 17, 2003 (KR) ............... 10-2003-0092521

(51) Int. Cl.
 *G06K 9/00* (2006.01)
(52) U.S. Cl. ............... 382/118; 382/190; 382/195
(58) Field of Classification Search ............... 382/118, 382/159, 181, 205, 173, 190, 220, 224–226, 382/305, 195; 358/403; 707/1–10; 82/165, 82/15; 72/356; 257/129, E23.102, E29.026, 257/E29.255, E21.692, E27.103; 359/632, 359/630

See application file for complete search history.

(56) References Cited

U.S. PATENT DOCUMENTS

| 7,035,467 B2 * | 4/2006 | Nicponski ............... 382/224 |
| 7,050,607 B2 * | 5/2006 | Li et al. ............... 382/118 |
| 7,099,510 B2 * | 8/2006 | Jones et al. ............... 382/225 |

FOREIGN PATENT DOCUMENTS

| KR | 2001-50988 | | 6/2002 |
| KR | 10-2003-0057979 | * | 3/2005 |

OTHER PUBLICATIONS

Sang-Hoon Kim; "Facial Features and Motion Recovery using multi-modal information and Paraperspective Camera Model"; Korean Information Management Institute Thesis; vol. 9-B; No. 5; Oct. 2002; pp. 563-570.

Daeho Lee, et al.; "Geometrical Feature-Based Detection of Pure Facial Regions"; Korean Information Management Institute Thesis: Software and Application; vol. 30, No. 8; Aug. 2003; pp. 773-779.

* cited by examiner

*Primary Examiner*—Sheela C Chawan
(74) *Attorney, Agent, or Firm*—Lowe Hauptman Ham & Berner LLP (57) ABSTRACT

A face detecting system using a symmetric axis includes: an image inputting unit for inputting a still image thereto; an image converting unit for reducing the inputted image to a first certain size of image for a real-time process by using a pyramidal resolution reduction way; a scanning unit for scanning the reduced image by applying a second certain size of symmetric mask; a region dividing unit for dividing a region of the scanned mask into a left region and a right region with respect to the symmetric axis; a symmetric-similarity computing unit for computing a symmetric similarity of a local region at the two divided regions and then computing a symmetric similarity of a global region to compute a symmetric similarity of a face region; and a face region extracting unit for extracting a region having a symmetric axis at which the computed symmetric similarity is above a predetermined value, as the face region.

23 Claims, 8 Drawing Sheets

——— : SYMMETRIC AXIS

FACE DETECTING SYSTEM AND METHOD USING SYMMETRIC AXIS

BACKGROUND OF THE INVENTION

1. Field of the Invention

The present invention relates to a face detecting system and method using a symmetric axis, and more particularly, to a face detecting system and method using a symmetric axis in which a certain-sized front face is allowed to be extracted from various image planes by using symmetric information.

2. Description of the Related Art

Recently, an appliance field of an image processing system for detecting and recognizing a face from an image inputted through various cameras (a personal computer (PC) camera, a portable phone camera, a charge coupled device (CCD) camera and the like) is expanded to a home robot, a game instrument, a portable phone, a PDA and the like. In such various devices, a need for a method for effectively detecting the face is increased.

A face detecting method is very important even as a previous step of a field of face identification, face expression recognition and the like. The face detecting method should satisfy the following several conditions so as to be applied to a real environment.

First, it should not have a particular limitation to illumination.

Second, it should not have a specific limitation to background.

Third, it should be indifferent to a user's age, hairstyle, makeup or the like.

Fourth, it should be indifferent to user's various poses and face expressions.

Fifth, it should be indifferent to a user's motion.

Sixth, a real-time process should be possible.

Several conventional face detecting methods, that is, a method for tracking the face by obtaining a differential image for a consecutive image, a method for detecting and analyzing an edge of a main facial part, a method for utilizing optical flow, a method for extracting a facial outline, a method for obtaining a face region by using a color model, and the like has a drawback in that the face region cannot be extracted even though all of the above-mentioned conditions are all satisfied.

In other words, the method of using the differential image has a drawback in that the background is complex or it is difficult to be applied to a complex background or a dynamic background, the method of detecting and analyzing the edge of the main facial part has a drawback in that it is difficult to be applied according to the user's hairstyle, the method of using the optical flow and the method of extracting the facial outline have a drawback in that they are improper to a real-time process since much computation time is required. Further, the method for dividing the face region by using the color model has a drawback in that it is sensitive to the illumination or the background due to its dependence only on color.

A conventional face detecting technique detects the face irrespective of a facial symmetric type when the face is extracted. Accordingly, it has a disadvantage in that a ratio of face detection is remarkably deteriorated depending on an external environment change of the background and a change of the user's pose, face expression and hairstyle.

SUMMARY OF THE INVENTION

Accordingly, the present invention is directed to a face detecting system and method using a symmetric axis, which substantially obviates one or more problems due to limitations and disadvantages of the related art.

It is an object of the present invention to provide a face detecting system and method using a symmetric axis in which a face can be extracted while the above-mentioned six conditions are all satisfied.

It is another object of the present invention to provide a face detecting system and method using a symmetric axis in which a face can be detected robustly against a change of an external environment or a user change since symmetry information on a face is basically used when the face is detected.

It is a further another object of the present invention to provide a face detecting system and method using a symmetric axis in which a certain-sized front face is allowed to be extracted from various image planes by using symmetric information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a face detecting system using a symmetric axis, the system including: an image inputting unit for inputting a still image thereto; an image converting unit for reducing the inputted image to a first certain size of image for a real-time process by using a pyramidal resolution reduction way; a scanning unit for scanning the reduced image by applying a second certain size of symmetric mask; a region dividing unit for dividing a region of the scanned mask into a left region and a right region with respect to the symmetric axis; a symmetric-similarity computing unit for computing a symmetric similarity of a local region (Symmetric_measure_local) at the two divided regions and then computing a symmetric similarity of a global region (Symmetric_measure_global) to compute a symmetric similarity of a face region; and a face region extracting unit for extracting a region having a symmetric axis at which the computed symmetric similarity is above a predetermined value, as the face region.

In another aspect of the present invention, there is provided a face detecting method using a symmetric axis, the method including the steps of: (a) inputting a still image thereto; (b) reducing the inputted image to a first certain size of image for a real-time process by using a pyramidal resolution reduction way; (c) scanning the reduced image by applying a second certain size of symmetric mask; (d) dividing the scanned mask into a left region and a right region with respect to the symmetric axis; (e) computing a symmetric similarity of a local region (Symmetric_measure_local) at the two divided regions and then computing a symmetric similarity of a global region (Symmetric_measure_global) to compute a symmetric similarity of a face region; and (f) extracting a region having a symmetric axis at which the computed symmetric similarity is above a predetermined value, as the face region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
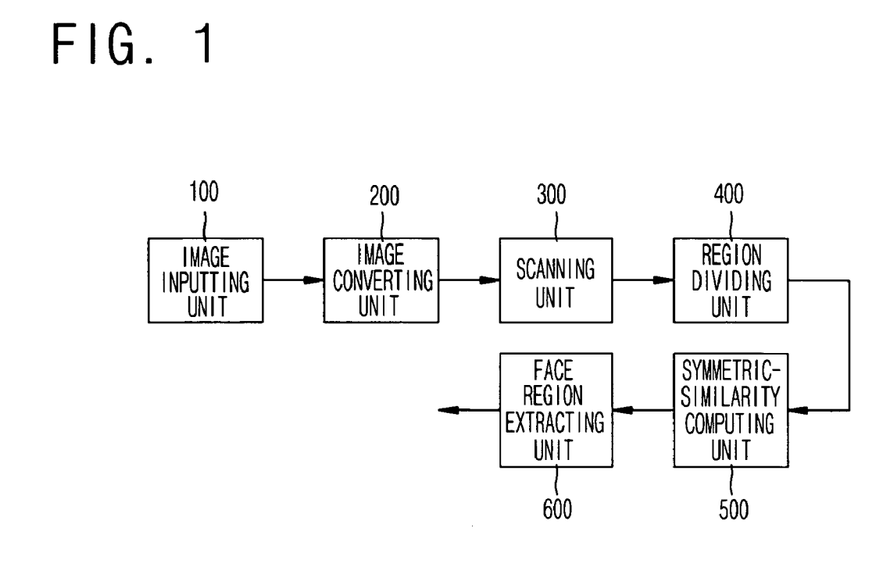
FIG. 1 is a block diagram illustrating a face detecting system using a symmetric axis according to a preferred embodiment of the present invention.

FIG. 1 is a block diagram illustrating a face detecting system using a symmetric axis according to a preferred embodiment of the present invention.

As shown in FIG. 1, the face detecting system using the symmetric axis according to a preferred embodiment of the present invention includes an image inputting unit 100 for inputting a still image thereto; an image converting unit 200 for reducing the inputted image to a 160×120 sized image for a real-time process by using a pyramidal resolution-reduction way; a scanning unit 300 for scanning the reduced image by using a 13×12 sized symmetric mask; a region dividing unit 400 for dividing a region of the scanned mask into a left region A and a right region B with respect to the symmetric axis; a symmetry-similarity computing unit 500 for computing a symmetric similarity of a local region (Symmetric_measure_local) at the two divided regions and then computing a symmetric similarity of a global region (Symmetric_measure_global) to compute a symmetric similarity of a face region; and a face region extracting unit 600 for extracting a region having the symmetric axis at which the computed symmetric similarity is above a certain value, as the face region.

An operation of the above-constructed face detecting system using the symmetric axis according to a preferred embodiment of the present invention is in detail described with reference to attached FIGS. 2 to 12 as below.

First of all, the present invention uses a certain sized mask having the symmetric axis so as to extract information on the symmetric similarity. At this time, a size of the mask is variably changed depending on a size of a find-targeted face and a size of the inputted image. The above extraction method using the mask has a general drawback in that real-time extraction is difficult since it takes a long time for extraction in case that the mask is large-sized or the inputted image is large-sized. In order to solve this drawback, the image converting unit 200 reduces the inputted image inputted through the image inputting unit 100 such that the inputted image always has a 160×120 size by using the pyramidal resolution-change way as shown in FIG. 2 (S100, S101).

Figure 2:
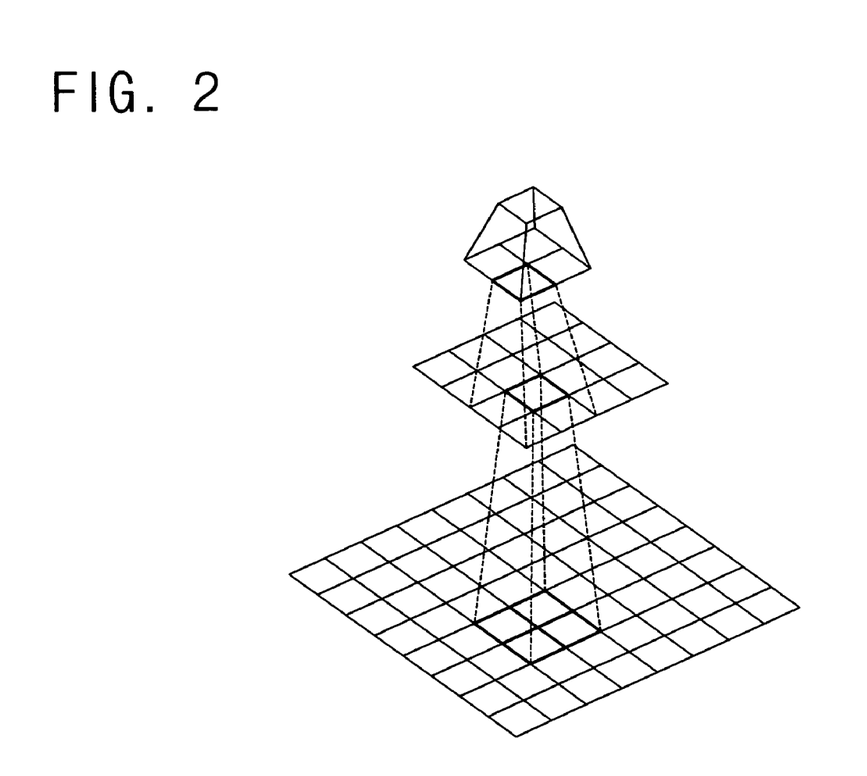
FIG. 2 is a view illustrating a resolution changing method of an inputted image using a pyramidal way performed at an image converting unit of FIG. 1.

The pyramidal resolution-reduction way is a way of changing a resolution up to the 160×120 size while reducing an n×m sized image to an $n/2^1 \times m/2^1$, $n/2^2 \times m/2^2$, ..., or $n/2^k \times m/2^k$ sized image, as shown in FIG. 2.

The image converting unit 200 reduces a 640×480 sized inputted image or a 320×240 sized inputted image to the 160×120 sized image by using the pyramidal resolution-reduction way. As an experimental result, in case that the image is reduced to above the 160×120 size, it is difficult to detect a symmetry of the face region due to excessive information loss, and also real-time face detection can be performed through a symmetric check mask to be used in the present invention.

Figure 3:
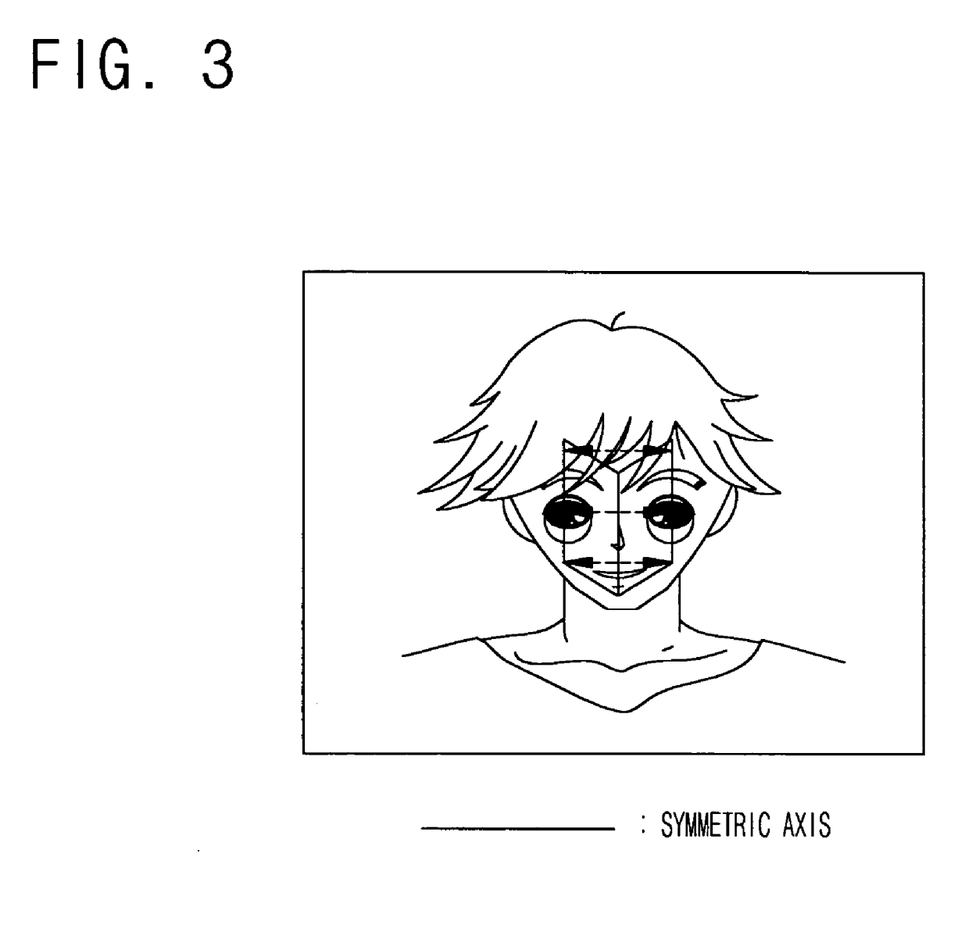
FIG. 3 is a view illustrating a basic concept of a face extracting method using symmetric information of FIG. 1.

Next, the scanning unit 300 applies the symmetric mask to the image reduced in the image converting unit 200, and then scans the symmetric mask (S102). As shown in FIG. 3, the symmetric mask used in the present invention is variably sized depending on any size of the face on the inputted image. When the face is taken through a general USB PC camera for the purpose of face recognition, the present invention selects a 13×12 sized symmetric mask as an optimal size through an experimental experience value. At this time, if a length of the symmetric axis is defined as "$T_{height}$" and a width of the symmetric axis is defined as "$T_{width}$", $T_{width}$=13 and $T_{height}$=12 are obtained.

Further, the present invention subsidiarily uses a 9×9 sized symmetric mask ($T_{height}$=9, $T_{width}$=9) so as to find a small sized face that is not found using a 13×12 sized symmetric mask. That is, only in case that any face is not found with the 13×12 sized symmetric mask, the 9×9 sized symmetric mask is again applied to check whether or not the small-sized face exists on the image. Face extraction can be adapted to various-sized faces on the inputted image through the two symmetric extraction masks different from each other.

However, the size of the symmetric mask used in the present invention is not fixed, but can be variably changed depending on an input environment or an occupation size of the face. Assuming that the various-sized faces exist within one image of a photograph, a newspaper or the like, symmetry check should be performed at several times while the size of the mask is increased or decreased by approximately 3 to 5 pixels. Repetitive application of the various-sized masks provides an advantage in that all-sized faces are allowed to be found, but due to a disadvantage of a long execution time, the size and the repetitive times of the mask are properly determined depending on the applied object.

Figure 4:
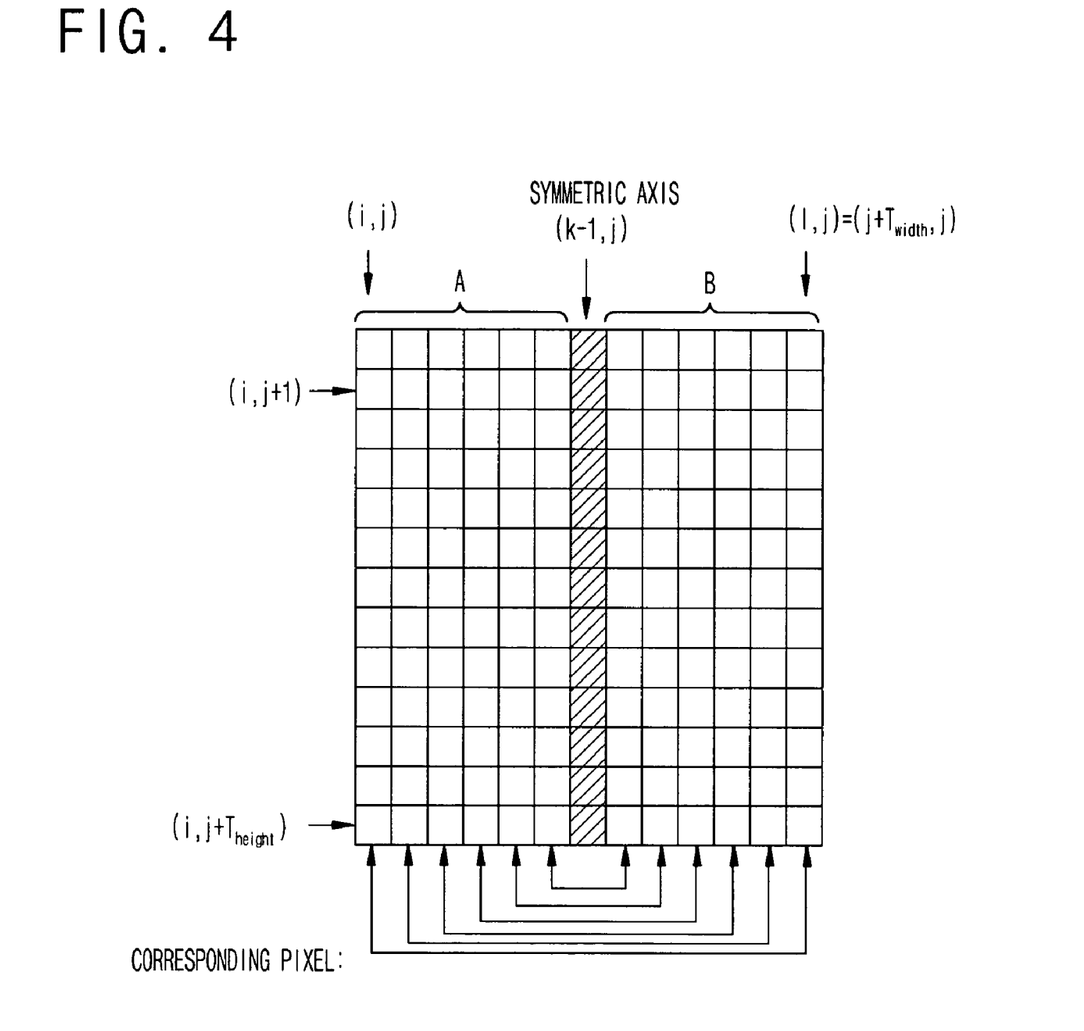
FIG. 4 is a view illustrating a coordinate system and a corresponding pixel of a symmetric mask applied at a scanning unit of FIG. 1.

Next, as shown in FIG. 4, the region dividing unit 400 divides the region of the symmetric mask scanned through the scanning unit 300 into the left region A and the right region B with respect to the symmetric axis (S103).

The symmetric-similarity computing unit 500 computes the symmetric similarity of the local region (Symmetric_measure_local) (S104). This is in detail described with reference to FIG. 11.

The inputted image can have many symmetric regions in even other regions than the face region. That is, even a background region having nothing can have a perfect mutual symmetry within the symmetric mask. Therefore, in order to extract only the face region from a symmetry candidate region, the present invention applies an additional rule such as Equation 1 to compute the symmetric similarity of the local region (Symmetric_measure_local).

Symmetric_measure_local = [Equation 1]

$W_1 *$ Symmetric_axis_check $+ W_2 *$ Upper_block_check $+$ $W_3 *$ Lower_block_check $+ W_4 *$ Other_checks $1.0 = W_1 + W_2 + W_3 + W_4$  [Equation 2]

Figure 8:
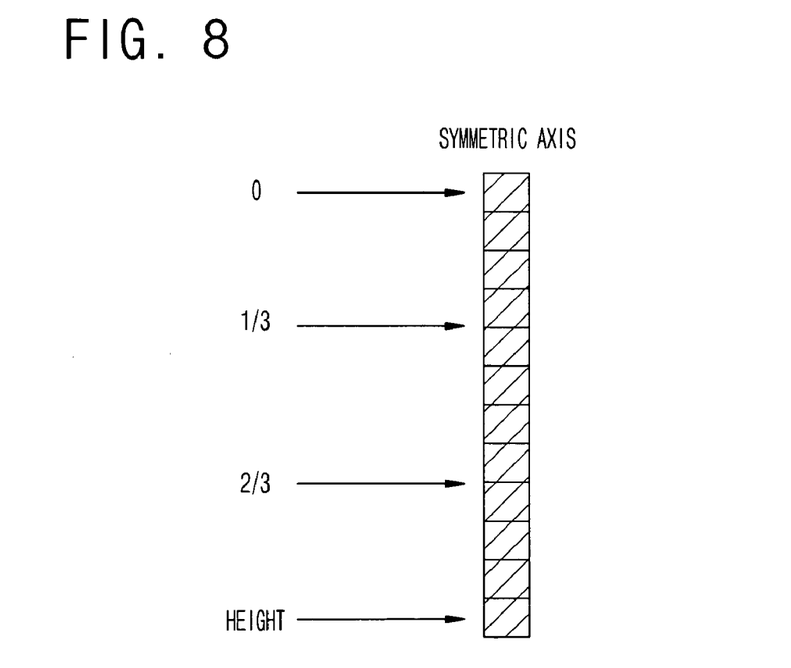
FIG. 8 is a view illustrating position information on a symmetric axis of FIG. 1.
Figure 11:
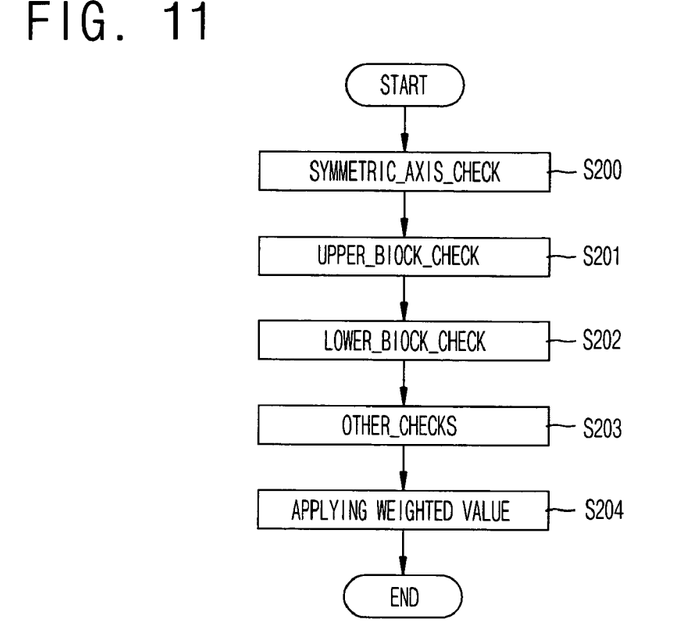
FIG. 11 is a flow chart illustrating a method for computing a symmetric similarity of a symmetric-similarity computing unit according to the present invention.

In the Equation 1, a rule having the highest weighted value among several rules for extracting the face region is a Symmetric_axis_check rule (S202). In this rule, a total average gray level of pixels SG(k,j) (Herein, j=0 to $T_{height}$) forming the symmetric axis in FIG. 4 is determined as a value of "Symmetric_threshold", and then this is used for binary-coding as shown in Equation 3 and analyzing its result. FIG. 8 shows position information on the symmetric axis.

$$\text{Symmetric axis } (k, j) = \sum_{j=0}^{j<T_{height}} \begin{cases} 255: & \text{if } (SG(k, j) < \text{Symmetric\_threshold}) \\ 0: & \text{otherwise} \end{cases}$$  [Equation 3]

In other words, since the symmetric axis corresponding to a human face region mostly have lower values at nose and lip portions, 255 being pixels always having a lower value than the value of the Symmetric_threshold should be obtained above the predetermined number of pixels (two pixels at $T_{height}=12$) till from ⅔ to $T_{height}$ regions corresponding to a lower portion of the symmetric axis, and the 255 should not be almost obtained from 0 to ⅓ regions. IF the above condition is used and satisfied, a value of Symmetric_axis_check=1 is allocated, and otherwise, a value of 0 is allocated.

Figure 9:
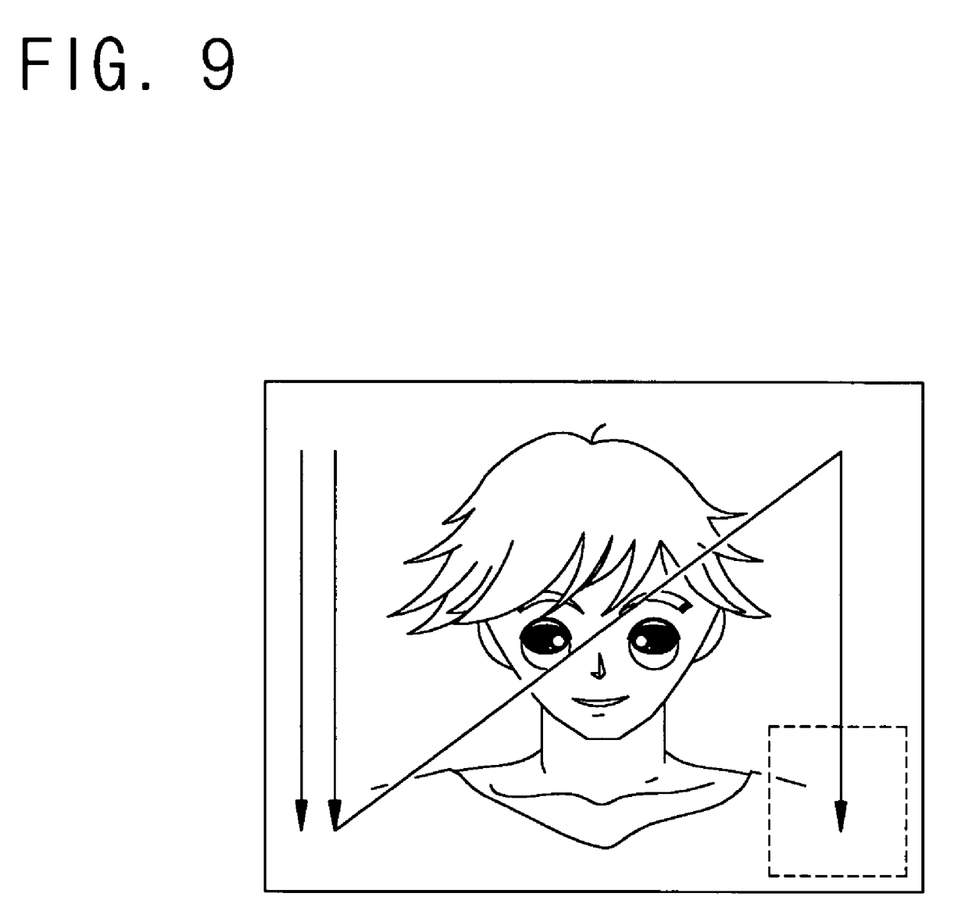
FIG. 9 is a view illustrating a method for scanning a symmetric axis of FIG. 1.

In order to reduce an execution time, the present invention shifts the symmetric axis up to down and left to right in the symmetric axis scanning method as shown in FIG. 9. The reason why scanning is performed using the above way is to use a way of analyzing a value of the symmetric similarity computed at a previous position not to shift the symmetric axis by one pixel, but to shift the symmetric axis by several pixels. That is, when the scanning is performed from up to down, the Symmetric_axis_check is performed. If it is determined that the pixel corresponding to 255 among the pixels of the symmetric axis exists above a predetermined number of pixels till from the ⅔ region to the $T_{height}$ region, a position of a next symmetric axis is determined jumping several pixels (approximately four pixels=⅓ height) when the position of the next symmetric axis is determined. This is to use information on which if a lot of the pixels having a value of the 255 are provided at an upper portion of the symmetric axis of the face region, they are not the face regions. Similarly, when the symmetric axis is shifted left to right, a value of a maximal symmetric similarity (Symmetric_measure) generated at a previous axis is analyzed. At this time, if the analyzed value is very small, the similarity is checked jumping several pixels (2 to 5 pixels depending on the value) in a lateral direction. This rule is based on the fact that, in case of the face, when the symmetric axis is shifted left to right, the value of Symmetric_measure is gradually increased such that when a perfect symmetry is obtained, the largest value is obtained and gradually decreased. That is, when the symmetric axis is shifted from left to right, since a case is not generated in which a large symmetric axis value suddenly appears, the symmetric axis of the face can be found even though great jumping is performed for shift if the value of the left axis is small, and small jumping is made for shift if it is large. If the symmetric axis is found using the above rule, a total execution time can be reduced by ¹/₁₀ to the maximum.

In the Equation 1, the "Upper_block_check" rule (S201) is a rule of checking whether or not the pixels of LT and RT blocks (Referring to FIG. 4) existing at 0 to above ⅓ heights of the symmetric axis include a binary-coded region corresponding to an eye region. At this time, the binary-coding of the LT and RT regions is performed by obtaining average gray values of each of the blocks (LT_gray_average_value) and (RT_gray_average_value), and then allocating the 255 to the pixel having the lower value than each block average and allocating 0 to the pixel having a high value every pixel of each block. At this time, the average gray level of the LT and RT block can be different depending on illumination. As a result of analyzing the binary-coded result, in case of the human face, the pixel having the 255 of always above the certain size should exist at LT and BT regions where $T_{height}$ is above 0 to ⅓ heights. However, if all of the pixels having the 255 exist only at this position, it is another evidence for proving that a nose or mouse region does not exist at a lower region. Therefore, when only from minimal 16 pixels corresponding to ⅓ to maximal 24 pixels corresponding to ½ of 48 pixels (48 pixels=area of an entire corresponding block $4(T_{height/3})*12(T_{width})$) have the 255 value, the Upper_block_check is allocated as "1" to determine as the face region, and otherwise, the Upper_block_check is allocated as "0".

In the Equation 1, the "Lower_block_check" rule (S202) is a rule of checking whether or not the pixels of the LT and RT blocks existing from ⅔ to $T_{height}$ heights of the symmetric axis include the binary-coding region corresponding to the mouse or the nose. That is, in case of the human face, the pixel having the 255 of always above the certain size corresponding to the nose or the mouse should exist at the LT and BT regions of till from ⅔ to $T_{height}$ Heights. However, if all of the pixels having the 255 exist at this position, it similarly acts as another evidence for proving that an eye region does not exist at the above-mentioned region. Therefore, when only from minimal 16 pixels corresponding to ⅓ to maximal 24 pixels corresponding to ½ of 48 pixels (48 pixels=area of an entire corresponding block $T_{height/3}*T_{width}$) have the 255 value, the Lower_block_check is allocated as "1" to determine as the face region, and otherwise, the Lower_block_check is allocated as "0".

In the Equation 1, excepting for the above-mentioned rules, the last Other_checks rules (S203) are several other rules of checking whether or not the symmetric mask includes the face region. For example, if the A and B regions have symmetric structures having the same gray distribution as each other, it is checked whether or not an AB_gray_threshold_difference (=abs (A_gray_average_value-B_gray_average_value)) between two average gray levels has the very small value, it is checked whether or not the pixels corresponding to the 255 of two symmetric blocks are generated closely to or distantly from the symmetric axis (in case of the face region, the nose or mouse region is generated closely to the symmetric axis and the eye region is generated distantly from the symmetric axis), and it is checked whether or not a gray binary-coded result is converged at one location and the like to investigate whether or not the image currently inputted to the symmetric mask is the face. According to this, a reliability value is allocated.

The symmetric-similarity computing unit 500 applies a weighted value to the computed face symmetric-axis checking rules (S204) to show whether or not the face symmetric-axis checking rules respectively distinguish the symmetry with any degree of importance.

Figure 10:
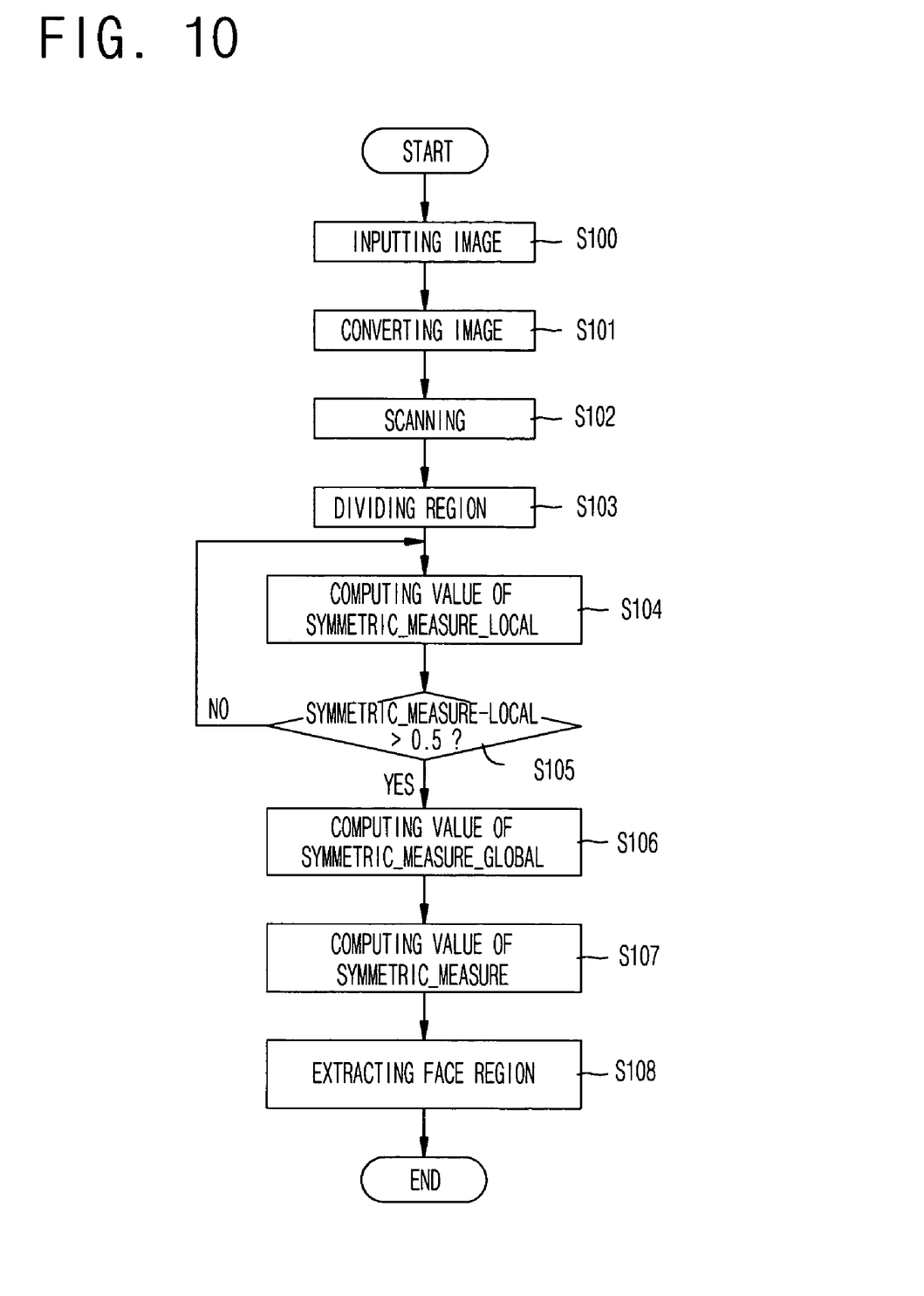
FIG. 10 is a flow chart illustrating a face detecting method using a symmetric axis according to the present invention.

As described above, the symmetric-similarity computing unit 500 basically, first of all, investigates whether or not the region having the currently allocated symmetric mask is the face region by using the Equation 1. That is, it is determined whether or not the Symmetric_measure_local has a value of 0.5 or more (S105). In case that the value of the Symmetric_measure_local is the value of more than 0.5 as a result of determination (S105), the symmetric-similarity computing unit 500 determines the local region as the face region to perform a step (S106) for computing the value of the Symmetric_measure_global. The reason why the above step (S105) is performed is that if both of the symmetric similarities are all checked even in a region not being the face region, the long execution time is taken to cause the real-time process to be difficult to be performed.

Figure 12:
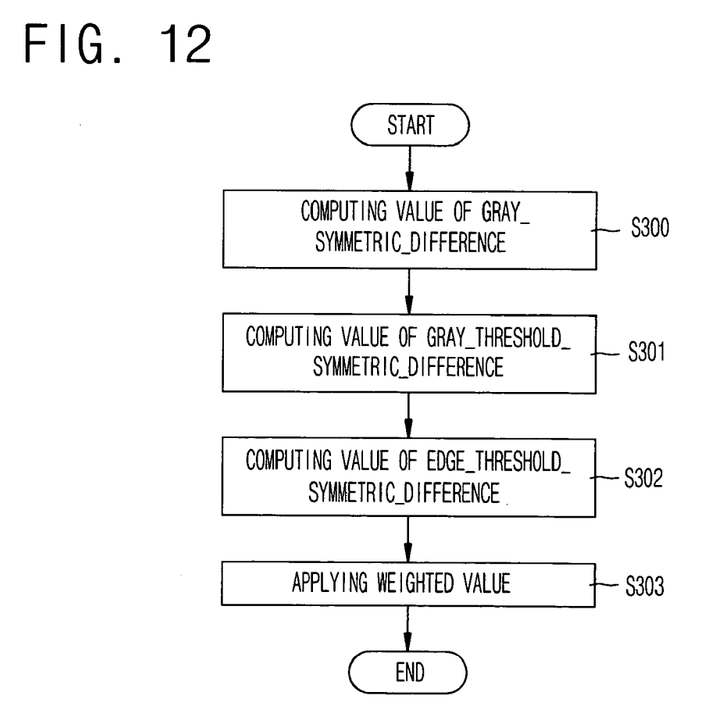
FIG. 12 is a flow chart illustrating a method for computing a value of Symmetric_measure_local by deciding a local region as a face region according to the present invention.

The above step (S106) is in detail described with reference to attached FIG. 12 as below.

The symmetric-similarity computing unit 500 firstly accumulates various differences between a left image and a right image with respect to the symmetric axis so as to detect the face region by applying a 13×12 sized symmetric mask. For this, the symmetric-similarity computing unit 500 basically detects differences of a gray image, a gray binary-coding image and an edge image, and obtains the symmetric similarity of the global region as in the Equation 4 (S106).

In other words, as shown in FIG. 4, when the left region is defined as "LT" and the right region is defined as "BT" with respect to the symmetric axis, and a gray value of the pixel located at (i,j) of the LT region is defined as "LTG(i,j)" and A gray value of the pixel located at (l,j) of the B region is defined as RTG(l,j), the symmetric-symmetry computing unit 500 computes the symmetric similarity of the global region (Symmetric_measure_global) as in the Equation 4 so as to measure the symmetry between the both regions LT and RT (S106).

$$\text{Symmetric\_measure\_global} = \quad\quad\quad\quad \text{[Equation 4]}$$
$$W_5 * \text{Gray\_symmetric\_difference} +$$
$$W_6 * \text{Gray\_threshold\_symmetric\_difference} +$$
$$W_7 * \text{Edge\_threshold\_symmetric\_difference}$$

$$1.0 = W_5 + W_6 + W_7 \quad\quad\quad\quad \text{[Equation 5]}$$

$$\text{Gray\_symmetric\_difference} = \sum_{i=0, j=0}^{j<T_{width}, j<T_{height}} (255 - \text{abs}(LTG(i,j) - BTG(l-i,j))) \quad\quad \text{[Equation 6]}$$

$$\text{Gray\_threshold\_symmetric\_difference} = \sum_{i=0, j=0}^{j<T_{width}, j<T_{height}} \begin{cases} 255: & \text{if } (LTGT(i,j) == 255 \text{ and } LTGT(l-i,j) == 255) \\ 0: & \text{otherwise} \end{cases} \quad\quad \text{[Equation 7]}$$

$$\text{Edge\_threshold\_symmetric\_difference} = \sum_{i=0, j=0}^{j<T_{width}, j<T_{height}} \begin{cases} 255: & \text{if } (LTET(i,j) == \text{ and } LTET(l-i,j) == 255) \\ 0: & \text{otherwise} \end{cases} \quad\quad \text{[Equation 8]}$$

The Equation 4 is a formula for checking whether or not how much symmetry the both regions having the symmetric axis have.

The symmetric-similarity computing unit 500 basically creates values of three images (the gray image, the gray binary-coding image, the edge binary-coding image) with respect to left and right images, and computes each of the symmetric similarities as in the Equations 6, 7 and 8 for sum-up (S300 to S302). At this time, the weighted value is set depending on importance of three images (S303) for sum-up. A total sum of the weighted value is "1" as in the Equation 5, and the weighted value is allocated depending on importance of each of the values according to the experiment. In the present invention, the gray image binary-coding result on basis of the result obtained through many experiments is most useful for distinguishing the symmetry such that a high weighted value is allocated as in the Equation 5, and the weighted value is allocated according to the reliability even for remaining images.

The symmetric-similarity computing unit 500 accumulates the difference of the gray value of the corresponding pixel for respective pixels of the A and B regions within the mask as in the Equation 6 to obtain the symmetric similarity between the two gray images (S300). The reason why a difference of the gray value is subtracted from the 255 in the Equation 6 is that if the two corresponding pixels are identical with each other, their difference is "0", and if the difference "0" is subtracted from the 255, the "255" is obtained as the similarity such that the similarity has a higher value.

Figure 5:
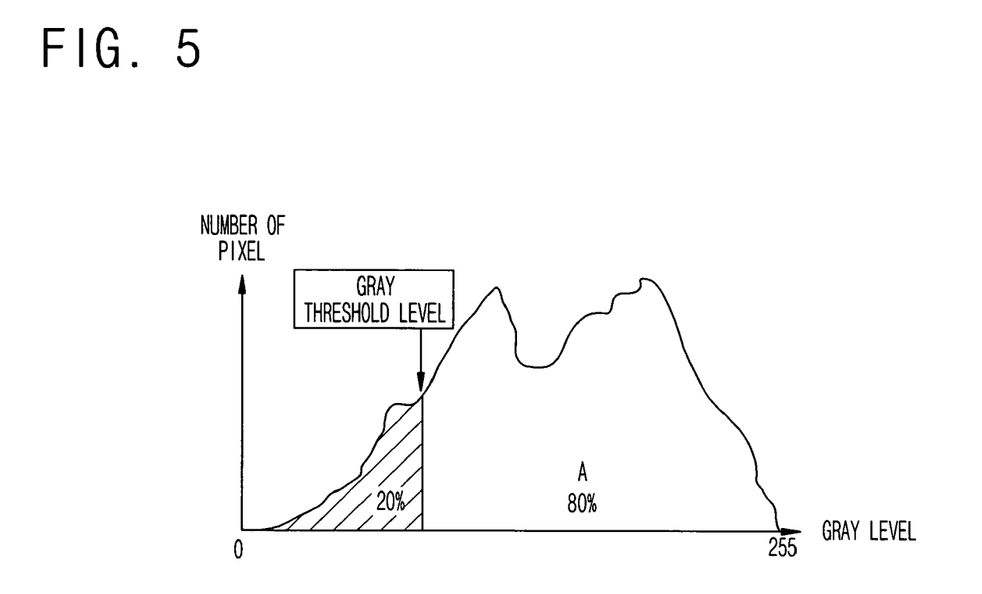
FIG. 5 is a view illustrating a method for setting a gray threshold level of FIG. 1.

The symmetric-similarity computing unit 500 performs binary-coding of the A and B regions within the mask as in the Equation 7, and then obtains a corresponding difference between the binary-coding images (S301). At this time, as a binary-coding algorithm used, an accumulation distribution of a gray histogram is used in the present invention. That is, after the gray distribution of the LT region within the mask is accumulated using the histogram, the gray value having the number of pixels with dark brightness reached to 20% among the total pixels is selected as the A_gray_threshold_value and then is used for binary-coding. At this time, the binary-coded result is stored in the LTGT (i,j) as in the Equation 9. FIG. 5 illustrates a threshold level determining method for binary-coding the gray image. Even the RT region within the mask is binary-coded by obtaining the B_gray_threshold_value in the same method, and then the result is stored in the RTGT (l,j) as in the following Equation 9.

[Equation 9]

$$LTGT(i++, j++)\Big|_{i=0,j=0}^{i<T_{width},j<T_{height}} = \begin{cases} 255: & \text{if } (LTG(i, j) < A\_gray\_threshold\_value \\ 0: & \text{otherwise} \end{cases}$$

$$RTGT(i--, j++)\Big|_{l=T_{width},j=n}^{l>0,j<T_{height}} = \begin{cases} 255: & \text{if } (RTG(l, j) < B\_gray\_threshold\_value \\ 0: & \text{otherwise} \end{cases}$$

Figure 6:
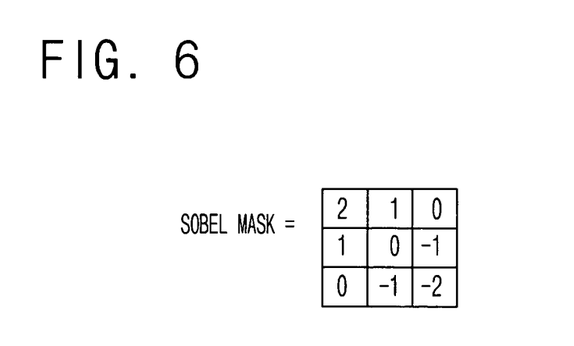
FIG. 6 is a view illustrating a sobel mask of FIG. 1.
Figure 7:
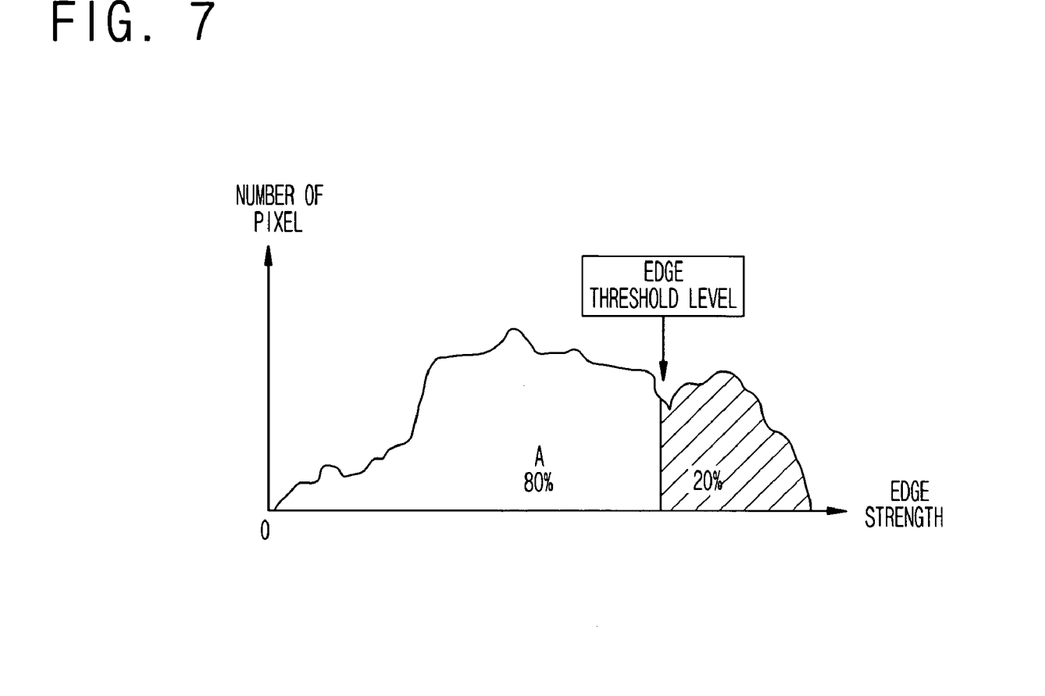
FIG. 7 is a view illustrating a method for setting an edge threshold level of FIG. 1.

Similarly, the symmetric-similarity computing unit 500 applies an edge mask to the LT and RT regions as in the Equation 8 and then binary-codes an edge strength to obtain a difference between the edge images (S302). After the present invention applies a sobel edge mask as shown in FIG. 6, the accumulation distribution of an edge strength histogram is used. That is, after the edge strength distribution of the A region within the mask is accumulated using the histogram, the strength value obtained by accumulating the number of pixels in an order of a largest edge strength among the total pixels to reach to 20% of the number of pixels is selected as the A_edge_threshold_value and then is used for binary-coding. At this time, the binary-coded result is stored in an AET(i,j) as in Equation 10. FIG. 7 illustrates the threshold level determining method for binary-coding the edge image. The B region within the mask is binary-coded by obtaining the B_edge_threshold_value in the same method, and then its result is stored in a BET(l,j) as in the following Equation 10.

[Equation 10]

$$LTET(i++, j++)\Big|_{i=0,j=0}^{i<T_{width},j<T_{height}} = \begin{cases} 255: & \text{if } (LTE(i, j) > A\_edge\_threshold\_value \\ 0: & \text{otherwise} \end{cases}$$

$$RTET(i++, j++)\Big|_{l=T_{width},j=0}^{l<0,j<T_{height}} = \begin{cases} 255: & \text{if } (RTG(l, j) < B\_edge\_threshold\_value \\ 0: & \text{otherwise} \end{cases}$$

The reason why 20% is selected by accumulating the number of pixels in an order of a low gray level at the time of setting the threshold level for the gray binary-coding is that an eye, a nose, a mouse and the like as main parts of the face region have lower gray levels than other background regions, and the reason why 20% is selected by accumulating the number of pixels in an order of a high gray level at the time of setting the threshold level for the edge binary-coding is that the eye, nose and mouse parts have high edge strengths. That is, in both cases, the threshold level is adjusted such that the binary-coded result is represented at the eye, the nose and the mouse of the person.

The face region extracting unit 700 extracts the face region from the inputted image by using the symmetric similarity value calculated in the Equations 1 and 4. That is, the region having the symmetric axis at which the Symmetric_measure (=Symmetric_measure_local+Symmetric_measure_global) is above a predetermined value is outputted as the face region (S107, S108).

As described above, the present invention has the following effects.

First, the method for extracting the face irrespective of various illumination and facial sizes is provided. Second, the method for extracting the face in real-time by using the resolution adjustment using the pyramid or by using the previously obtained symmetric similarity value.

Further, the present invention has an effect in that, when the symmetric similarity is checked, an error in which the background region is decided as the face region is eliminated by using the gray image, the gray binary-coding image, the edge binary-coding image and the like, and exactness of real-time process and face extraction can be increased by combining several rules for determining whether the face is or not.

Furthermore, the face extraction method using the symmetry provided in the present invention has an advantage in that even when various objects having the symmetry as well as the face, for example, matters of a ball, a cap, a phone, a book and the like, several rules are created for distinguishing the matters to provide easy extensibility.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A face detecting system using a symmetric axis, the system comprising:
   an image inputting unit for inputting a still image thereto;
   an image converting unit for reducing the inputted image to a first certain size of image for a real-time process by using a pyramidal resolution reduction way;
   a scanning unit for scanning the reduced image by applying a second certain size of symmetric mask;
   a region dividing unit for dividing a region of the scanned mask into a left region and a right region with respect to the symmetric axis;
   a symmetric-similarity computing unit for computing a symmetric similarity of a local region (Symmetric_measure_local) at the two divided regions and then computing a symmetric similarity of a global region (Symmetric_measure_global) to compute a symmetric similarity of a face region; and
   a face region extracting unit for extracting a region having a symmetric axis at which the computed symmetric similarity is above a predetermined value, as the face region.

2. The face detecting system of claim 1, wherein the first certain size is 160×120 (width×length).

3. The face detecting system of claim 1, wherein the second certain size is 13×12 (width×length).

4. The face detecting system of claim 1, wherein the second certain size is 9×9 (width×length).

5. The face detecting system of claim 1, wherein in case that the symmetric similarity of the local region (Symmetric_measure_local) computed in the symmetric-similarity computing unit is above a certain value, the symmetric similarity of the global region (Symmetric_measure_global) is computed.

6. The face detecting system of claim 1, wherein the symmetric similarity of the local region (Symmetric_measure_local) computed in the symmetric-similarity computing unit is computed in the following Equations 1 and 2

$$\text{Symmetric\_measure\_local} = \qquad \text{[Equation 1]}$$
$$W_1 * \text{Symmetric\_axis\_check} + W_2 * \text{Upper\_block\_check} +$$
$$W_3 * \text{Lower\_block\_check} + W_4 * \text{Other\_checks}$$

$$1.0 = W_1 + W_2 + W_3 + W_4. \qquad \text{(Equation 2)}$$

7. The face detecting system of claim 6, wherein the Symmetric_axis_check is performed by binary-coding pixels forming the symmetric axis into a symmetric-axis threshold level as in the following Equation 3, and then analyzing the binary-coded result $$\text{Symmetric axix}(k, j) \sum_{j=0}^{j<T_{height}} \begin{cases} 255: & \text{if } (SG(k, j) < \\ & \text{Symmetric\_threshold}) \\ 0: & \text{otherwise} \end{cases} \qquad \text{(Equation 3)}$$

8. The face detecting system of claim 6, wherein the Symmetric_axis_check is performed by shifting the symmetric axis of the symmetric mask up to down and left to right to check the symmetric axis while jumping without checking all regions of the symmetric mask.

9. The face detecting system of claim 6, wherein the Upper_block_check is performed by checking whether or not pixels of a block existing from 0 to above ⅓ heights of the symmetric axis include a binary-coding region corresponding to an eye.

10. The face detecting system of claim 6, wherein the Lower_block_check is performed by checking whether or not pixels of a block existing from ⅔ to lowest ($T_{height}$) heights of the symmetric axis include a binary-coding region corresponding to a mouse or a nose.

11. The face detecting system of claim 1, wherein the symmetric similarity of the global region (Symmetric_measure_global) computed in the symmetric-similarity computing unit is computed in the following Equations 4 and 5.

$$\text{Symmetric\_measure\_global} = \qquad \text{[Equation 4]}$$
$$W_5 * \text{Gray\_symmetric\_difference} +$$
$$W_6 * \text{Gray\_threshold\_symmetric\_difference} +$$
$$W_7 * \text{Edge\_threshold\_symmetric\_difference}$$

$$1.0 = W_5 + W_6 + W_7 \qquad \text{(Equation 5)}$$

12. The face detecting system of claim 1, wherein the symmetric-similarity computing unit performs a symmetric axis check by shifting the symmetric axis of the symmetric mask from up to down and from left to right to check the symmetric axis while jumping without checking all regions of the symmetric mask.

13. A face detecting method using a symmetric axis, the method comprising the steps of:
(a) inputting a still image thereto;
(b) reducing the inputted image to a first certain size of image for a real-time process by using a pyramidal resolution reduction way;
(c) scanning the reduced image by applying a second certain size of symmetric mask;
(d) dividing the scanned mask into a left region and a right region with respect to the symmetric axis;
(e) computing a symmetric similarity of a local region (Symmetric_measure_local) at the two divided regions and then computing a symmetric similarity of a global region (Symmetric_measure_global) to compute a symmetric similarity of a face region; and
(f) extracting a region having a symmetric axis at which the computed symmetric similarity is above a predetermined value, as the face region.

14. The face detecting method of claim 13, wherein in case that the symmetric similarity of the local region computed in the step (e) is above a certain value, the symmetric similarity of the global region (Symmetric measure_global) is computed.

15. The face detecting method of claim 13, wherein the symmetric similarity of the local region (Symmetric_measure_local) computed in the step (e) is computed in the following Equations 1 and 2

$$\text{Symmetric\_measure\_local} = \qquad \text{[Equation 1]}$$
$$W_1 * \text{Symmetric\_axis\_check} + W_2 * \text{Upper\_block\_check} +$$
$$W_3 * \text{Lower\_block\_check} + W_4 * \text{Other\_checks}$$

$$1.0 = W_1 + W_2 + W_3 + W_4. \qquad \text{(Equation 2)}$$

16. The face detecting method of claim 15, wherein the Symmetric_axis_check is performed by binary-coding pixels forming the symmetric axis into a symmetric-axis threshold level, and then analyzing the binary-coded result.

17. The face detecting method of claim 15, wherein the Symmetric_axis_check is performed by shifting the symmetric axis of the symmetric mask up to down and left to right to check the symmetric axis while jumping without checking all regions of the symmetric mask.

18. The face detecting method of claim 15, wherein the Upper_block_check is performed by checking whether or not pixels of a block existing from 0 to above ⅓ heights of the symmetric axis include a binary-coding region corresponding to an eye.

19. The face detecting method of claim 15, wherein the Lower_block_check is performed by checking whether or not pixels of a block existing from ⅔ to lowest ($T_{height}$) heights of the symmetric axis include a binary-coding region corresponding to a mouse or a nose.

20. The face detecting method of claim 13, wherein the symmetric similarity of the global region computed in the step (e) is computed in the following Equations 6 to 9

$$\text{Gray\_symmetric\_difference} = \sum_{i=0, j=0}^{j<T_{width}, j<T_{height}} (255 - \text{abs}(LTG(i, j) - BTG(l-i, j))) \quad \text{(Equation 6)}$$

$$\text{Gray\_threshold\_symmetric\_difference} = \sum_{i=0, j=0}^{j<T_{width}, j<T_{height}} \begin{cases} 255 : \text{if } (LTGT(i, j) == 255 \text{ and } LTGT(l-i, j) == 255) \\ 0 : \text{otherwise} \end{cases} \quad \text{(Equation 7)}$$

$$\text{Edge\_threshold\_symmetric\_difference} = \sum_{i=0, j=0}^{j<T_{width}, j<T_{height}} \begin{cases} 255 : \text{if } (LTET(i, j) == 255 \text{ and } LTET(l-i, j) == 255) \\ 0 : \text{otherwise} \end{cases} \quad \text{(Equation 8)}$$

$$LTGT(i++, j++) = \sum_{i=0, j=0}^{i<T_{width}, j<T_{height}} \begin{cases} 255 : \text{if } (LTG(i, j) < A\_\text{gray\_threshold\_value}) \\ 0 : \text{otherwise} \end{cases} \quad \text{\{Equation 9\}}$$

$$RTGT(i--, j++) = \sum_{l=T_{width}, j=n}^{i<0, j<T_{height}} \begin{cases} 255 : \text{if } (RTG(l, j) < B\_\text{gray\_threshold\_value}) \\ 0 : \text{otherwise} \end{cases}$$

21. The face detecting method of claim 13, wherein further comprising binary-coding pixels forming the symmetric axis into a symmetric-axis threshold level, and then analyzing the binary-coded result.

22. A face detecting method using a symmetric axis, the method comprising the steps of:
reducing an inputted image to a reduced image of a first certain size for real-time processing by using pyramidal resolution reduction;
scanning regions the reduced image by applying a symmetric mask of a second certain size;
dividing each scanned region of the reduced image into a first region and a second region which are located symmetrically with respect to a symmetric axis of the symmetric mask;
calculating a local symmetric similarity at the divided first and second regions to determine whether the scanned region corresponds to a face region or not;
upon a determination that the scanned region corresponds to a face region, computing a global symmetric similarity of the scanned region by accumulating differences between pixels of the first region and corresponding pixels of the second region, wherein each of the pixels of the first region and the corresponding pixel of the second region are located symmetrically with respect to the symmetric axis;
computing a symmetric similarity of the scanned region based on the local symmetric similarity and global symmetric similarity; and
when the computed symmetric similarity is above a predetermined value, extracting the scanned region as a face region.

23. The method of claim 22, wherein the global symmetric similarity is computed as a weighted sum of
differences in gray images of the first and second regions,
differences in gray images of the first and second regions, and
differences in edge binary-coding images of the first and second regions.

* * * * *